United States Patent [19]

Nakanishi et al.

[11] Patent Number: 4,748,386
[45] Date of Patent: May 31, 1988

[54] CONTROLLER OF BRUSHLESS DC MOTOR

[75] Inventors: Yuji Nakanishi; Hajime Kanki, both of Hyogo, Japan

[73] Assignee: Sanyo Electric Co., Ltd., Japan

[21] Appl. No.: 907,737

[22] Filed: Sep. 10, 1986

[30] Foreign Application Priority Data

Sep. 20, 1985 [JP] Japan .................. 60-209693
Sep. 20, 1985 [JP] Japan .................. 60-209696

[51] Int. Cl.[4] ........................... H02P 5/16; H02P 6/02
[52] U.S. Cl. .................................... 318/254; 318/138; 318/434; 318/315
[58] Field of Search ............... 318/138, 254, 439, 434, 318/301, 309, 312, 315; 361/23

[56] References Cited

U.S. PATENT DOCUMENTS

| Re. 31,278 | 6/1983 | Schmider | 310/268 |
| 3,997,829 | 12/1976 | Suzaki et al. | 318/685 |
| 4,125,782 | 11/1978 | Pollnow, Jr. | 307/35 |
| 4,208,621 | 6/1980 | Hipkins et al. | 318/138 |
| 4,270,074 | 5/1981 | Duckworth et al. | 318/254 |
| 4,532,461 | 7/1985 | Crook | 318/254 |
| 4,535,274 | 8/1985 | Suzuki et al. | 318/254 |
| 4,546,293 | 10/1985 | Peterson et al. | 318/138 X |
| 4,680,515 | 7/1987 | Crook | 318/138 X |
| 4,686,437 | 8/1987 | Langley et al. | 318/138 X |

FOREIGN PATENT DOCUMENTS

| 56-10091 | 2/1981 | Japan | 318/138 |
| 58-144585 | 8/1983 | Japan | 318/254 |
| 60-170491 | 9/1985 | Japan | 318/254 |
| 1449058 | 8/1973 | United Kingdom . | |

Primary Examiner—Bentsu Ro
Attorney, Agent, or Firm—Darby & Darby

[57] ABSTRACT

A controller of a DC brushless motor comprises a microcomputer. The microcomputer receives signals from three hall elements being disposed in association with the DC brushless motor and for detecting the rotating position of a rotor magnet of the DC brushless motor. On the basis of the position detecting signals, the data of the rotating number of the rotor magnet may be evaluated. When the number of the rotation thus evaluated is below the predetermined rotating number, the microcomputer stops the power supply to the DC brushless motor from a switching power source. In order to evaluate such data of rotating number, an internal interruption is started at every predetermined period in the microcomputer. The microcomputer determines at every internal interruption whether or not a counter which is reset at each rotation of the rotor magnet has overflowed, and the data of rotating number is evaluated on the basis of repetition times of the internal interruptions and periods required for such overflow.

15 Claims, 10 Drawing Sheets

F I G.10
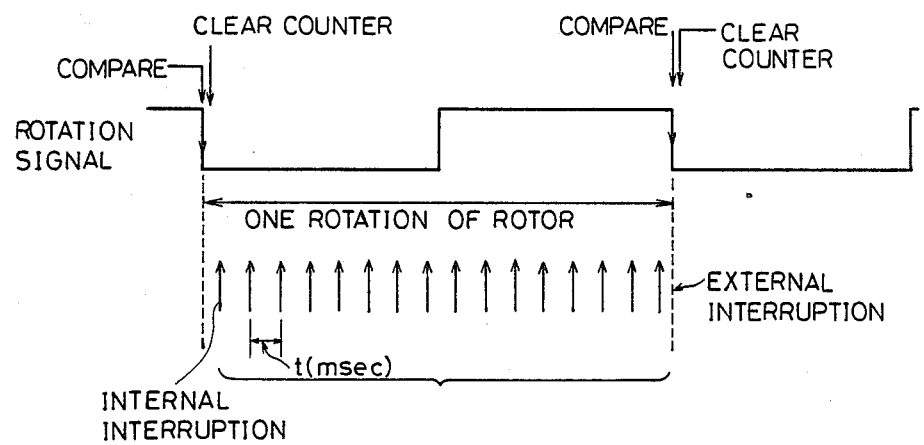

CONTROLLER OF BRUSHLESS DC MOTOR

BACKGROUND OF THE INVENTION

1. Field of the Invention

The present invention relates to a controller of a DC brushless motor. More specifically, the present invention relates to the controller for protection against abnormal rotation of the DC brushless motor having a variable rotating speed, which is used, for example, in an electric fan.

2. Description of the Prior Art

Such protection and control apparatus is disclosed for example in the Japanese Patent Application Laying-open No. 62035/1981 laid-open on May 27, 1981. In the prior art, it is suggested to detect the number of rotation of DC motor to operate a protection circuit for cutting off the power supply to the DC motor when the rotations decreased below a predetermined number. In order to detect the rotation number in the conventional practice, particular rotation number detecting means is necessary, resulting in a complicated controlling apparatus.

SUMMARY OF THE INVENTION

It is therefore a principal object of the present invention to provide a controller capable of detecting an abnormal state of a DC brushless motor with a simple construction.

In brief, the present invention is a controller of a DC brushless motor comprising position detecting means disposed in relation with the DC brushless motor for detecting the position of a rotor, data evaluating means for evaluating data of rotation number of the rotor on the basis of the position detecting means, comparing means for comparing the data of rotation number of the rotor as evaluated by the data evaluating means and a predetermined value, and electric power controlling means for controlling a power supply in response to a result of the comparison by the comparing means.

According to the present invention, because the signal from the position detecting means disposed in relation with the DC brushless motor can be utilized directly for determining the abnormal state of rotation, any particular means for detecting the rotation number is not needed, thus resulting in a simple construction of the controller. Besides, according to the present invention, an abnormal state of the brushless motor such as a locked state can be detected by the data of the rotation number, therefore, a more accurate control is possible in comparison with the one which controls the motor in accordance with the back electromotive voltage drop.

If an abnormal state is detected by a determining means at each turn of rotation of rotor magnet, an immediate remedy can be taken against such abnormal state, assuring the way to protect the DC brushless motor more efficiently.

These objects as well as other objects, features, aspects and advantages of the present invention will become more apparent with the detailed descriptions of the embodiments of the present invention made in conjunction with accompanying drawings which follows.

BRIEF DESCRIPTION OF THE DRAWINGS

FIG. 10 is a schematic view showing an internal interruption timing and its cyclic period.

DESCRIPTION OF THE PREFERRED EMBODIMENTS

Figure 1:
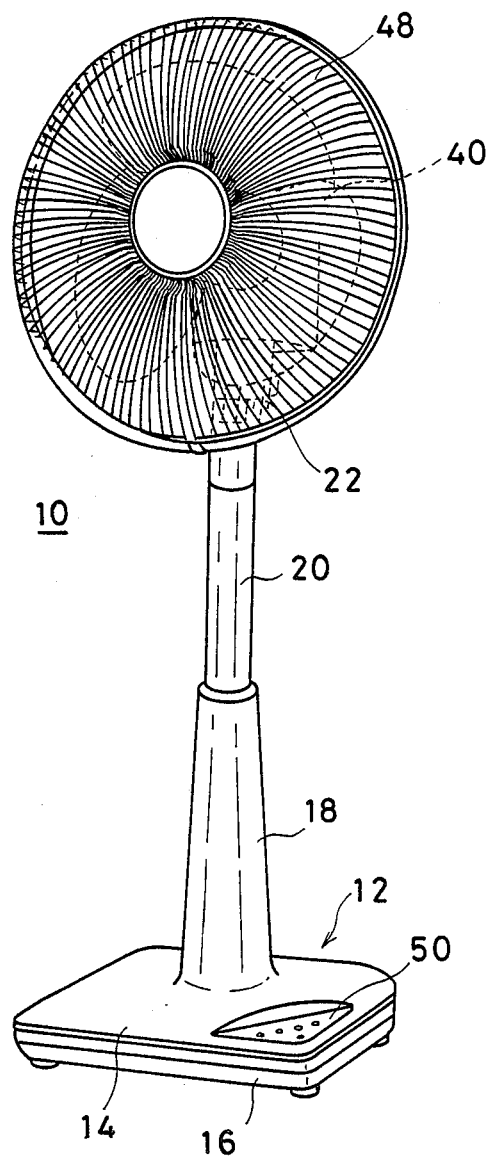
FIG. 1 is an external view showing one example of an electric fan to which the present invention can be advantageously applied.
Figure 2:
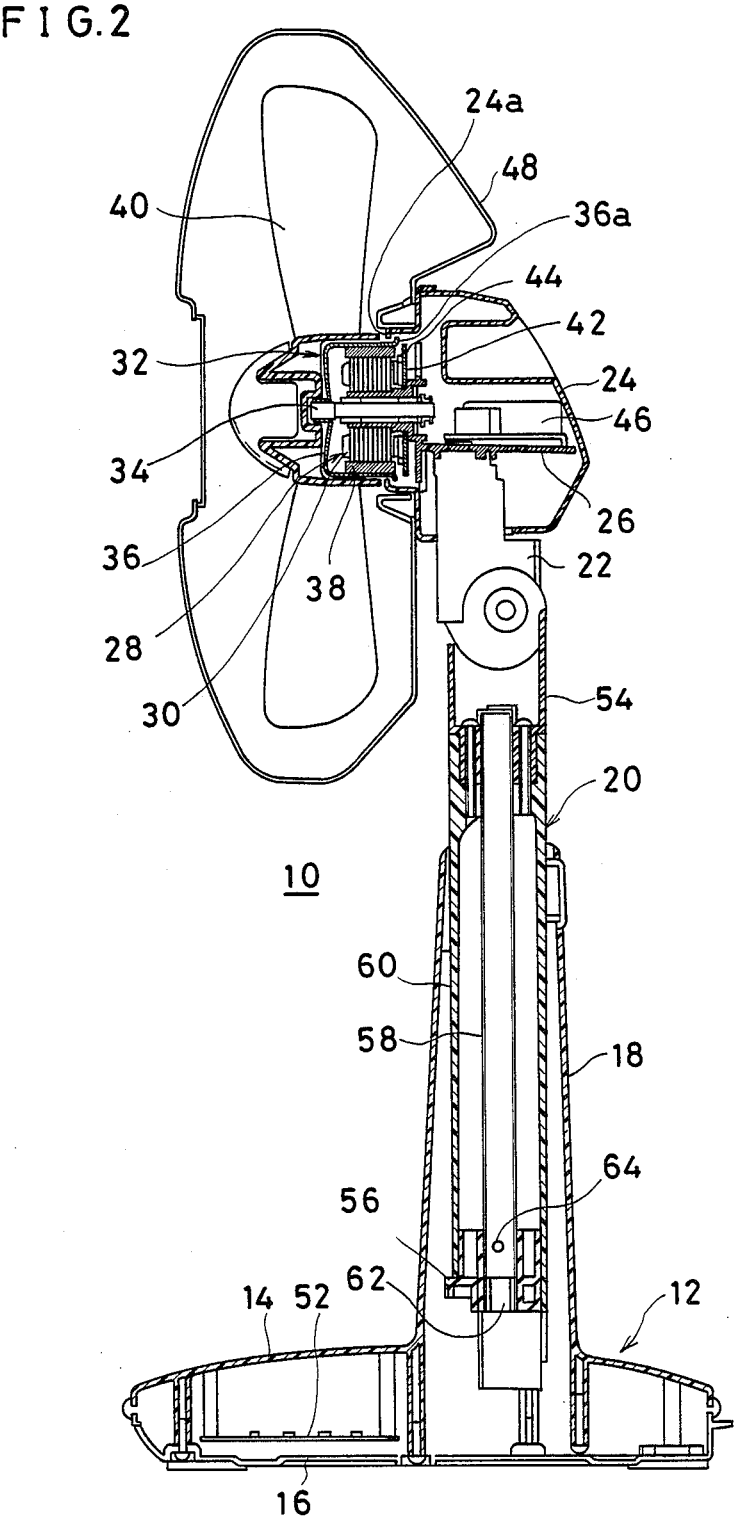
FIG. 2 is a cross-sectional schematic view showing the construction of the electric fan of FIG. 1.

FIGS. 1 and 2 illustrate one embodiment in accordance with the present invention. An electric fan 10 comprises a stand 12 which includes a stand ornament 14 and a bottom plate 16 being engaged thereto. Extending upwardly from the stand ornament 16, is formed a hollow pole brace 18 into which a supporting member 20 is inserted in a manner the same is movable vertically. On the upper end of the supporting member 20, a neck-piece 22 is supported movably in elevation.

On the neck-piece 22, as shown in FIG. 2, there is installed a motor cover 24, in which a mounting base plate 26 having an L-shaped cross section is disposed. The mounting base plate 26 is, in the embodiment, molded from the diecasting aluminum and supported by the neck-piece 22 at its one side portion.

The substantially vertical other side portion of the mounting base plate 26 bears a rotary shaft 34 of a DC brushless motor 28. The DC brushless motor 28 is constructed as an outer rotating type motor and includes an inner stator 30 consisting of windings formed around the periphery of a cylindrical body made of a magnetic material and an outer rotor 32 provided with a magnet 38 secured to the inner wall of a closed bottom cylindrical (cup-shaped) yoke 36 surrounding the stator 30 serving also as a casing. Extending generally through the center of the inner stator 30, the rotary shaft 34 is arranged and on the tip of the rotary shaft 34, the bottom of the yoke 36 described in the above is secured substantially at the center thereof. Accordingly, in the DC brushless motor 28, the outer rotor 32 will rotate.

An impeller 40 is secured to the tip of the rotary shaft 34 so as to cover the peripheral surface of the yoke 36 forming the outer rotor 32 by the boss thereof. More specifically, the tip of the rotary shaft 34 is threaded to screw a spinner thereon, thereby securing the impeller 40 to the rotary shaft 34.

On the rear end of the DC brushless motor 28 (right side in FIG. 2), the rotary shaft 34 is extended through and a board 42 is fixedly installed thereon. In the embodiment, a hall IC 44 is mounted on the board 42 for detecting a position of the rotor 32.

Meanwhile, as it will be apparent from FIG. 2, the peripheral edge on the opening side of the closed bottom cylindrical yoke 36 is formed with a collar 36a lifted outwardly. The peripheral edge on the opening side of the motor cover 24 is bent inwardly to form a collar 24a so as to engage to or surround the collar 36a. By the collars 24a and 36a, the penetration dusts into the motor cover 24 may be profitably prevented. More specifically, between two collars 24a and 36a, the air current flowing outwardly is produced by the rotation of the impeller 40, thereby forming a so-called air curtain and thus preventing dusts from entering therebetween. Moreover, there is an advantage that the DC brushless motor 28 is cooled by the air current between the collars 24a and 36a.

Figure 3:
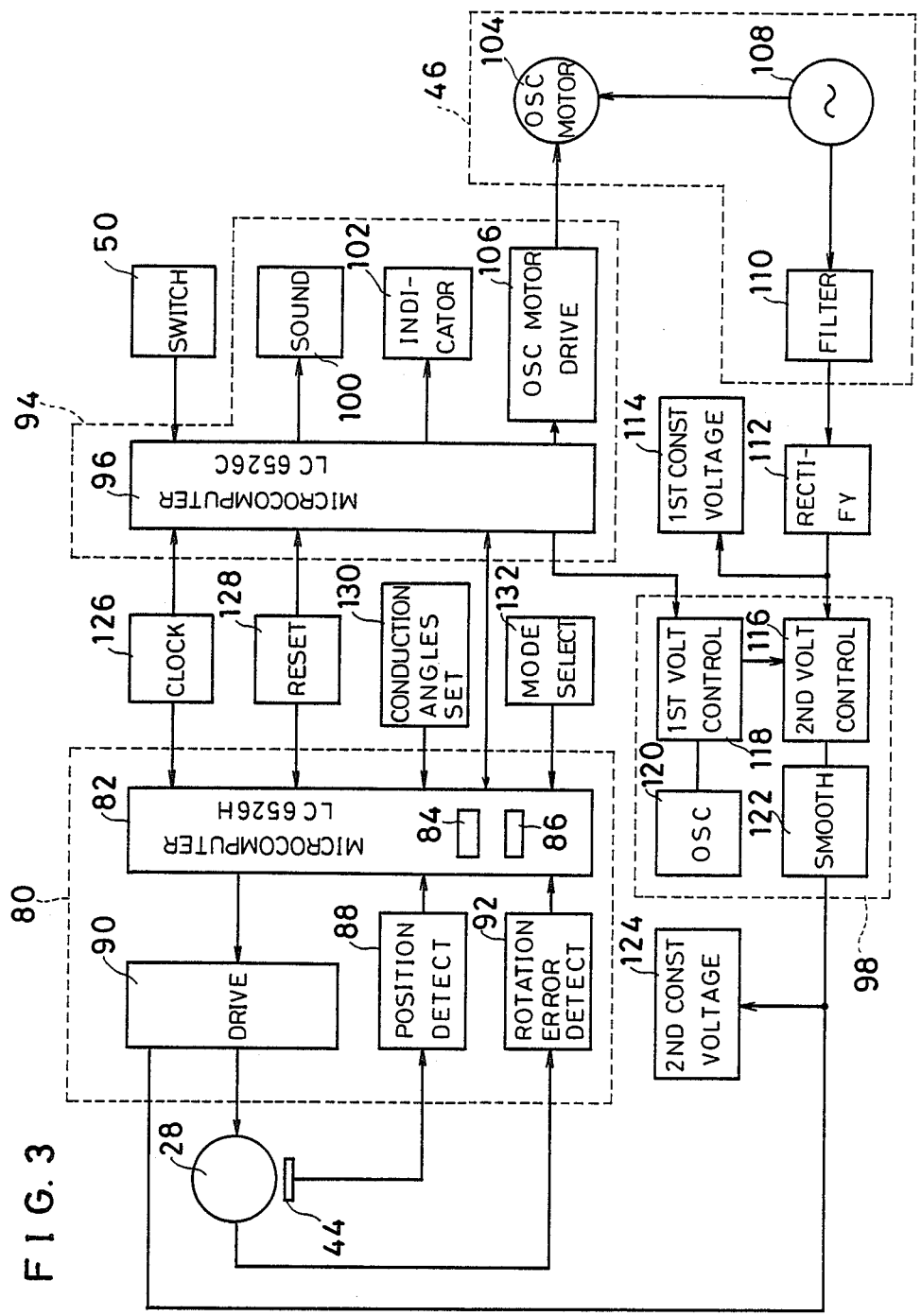
FIG. 3 is a block diagram showing one embodiment of the present invention.

Inside the motor cover 24, an oscillating device 46 secured on the upper surface of one side portion of the L-shaped mounting base plate 26 described above is disposed. The oscillating device 46 includes an induction motor as shown in FIG. 3, and oscillates the impeller 40 on both sides through a crank mechanism (not shown). The oscillating motor may be of a DC motor.

In front of the motor cover 24, a guard 48 covering the impeller 40 is installed.

As shown in FIG. 1, on the upper surface of the stand ornament 14, there is provided a switch 50 which is connected to a board 52 disposed within the stand 12 and used for setting an operation condition such as speed and so on. The board 52 is installed within the stand 12 by means of a suitable boss, and provided with a control circuit to be explained later particularly in connection with FIGS. 3 and 4.

Referring to FIG. 2, the supporting member 20 extending through the pole brace 18 extending upwardly from the stand 12, includes a supporting portion 54 provided at its upper end for mounting the aforementioned neck-piece 22 and a telescopic guide 56 arranged at its lower end for guiding the telescopic motion thereof. The supporting member 20 consists of a tubular metal pole brace 58 and a cylinder ornament 60 covering the metal pole brace 58 and formed by molding a synthetic resin. The cylinder ornament 60 is put on the projections formed on the aforementioned supporting portion 54 and the telescopic guide 56 at its upper and lower ends. Then, the lower end of the metal pole brace 58 is inserted into an inserting hole formed in the telescopic guide 56 to engage therewith and the upper end thereof is inserted into an inserting opening formed in the supporting portion 54 to engage therewith.

On the lower end of the inserting hole in the telescopic guide 56, a rib 62 is formed to engage the inner surface of the lower end of the metal pole brace 58. The lower portion of the cylinder ornament 60, the telescopic guide 56 and the lower portion of the metal pole brace 58 are secured in a single body by a machine screw 64 screwed in from the side.

The upper end of the metal pole brace 58 is merely inserted into the above mentioned inserting opening, and not secured together with the supporting portion 54 and the upper portion of the cylinder ornament 60. The metal pole brace 58 is, thus, freely slidable vertically within the inserting opening of the supporting portion 54. A predetermined gap is also formed in the inserting direction of the metal pole brace 58 in the inserting opening of the supporting portion 54.

In case of the expansion/contraction of the supporting member 20 due to changes in the ambient temperature, a degree of expansion/contraction differs between the cylinder ornament 60 made of a synthetic resin and the metal pole brace 58, the expansion/contraction of the metal pole brace 58 being larger than that of the cylinder ornament 60. Accordingly, in the embodiment, as previously explained the cylinder ornament 60 and the metal pole brace 58 are secured or integrated at their lower ends, but the metal pole brace 58 is made free to expand or contract within the inserting opening of the supporting portion 54 at its upper end, thereby absorbing the difference of expansion/contraction caused by the changes in temperature. The gap described above will then serve effectively for such absorption.

Figure 4:
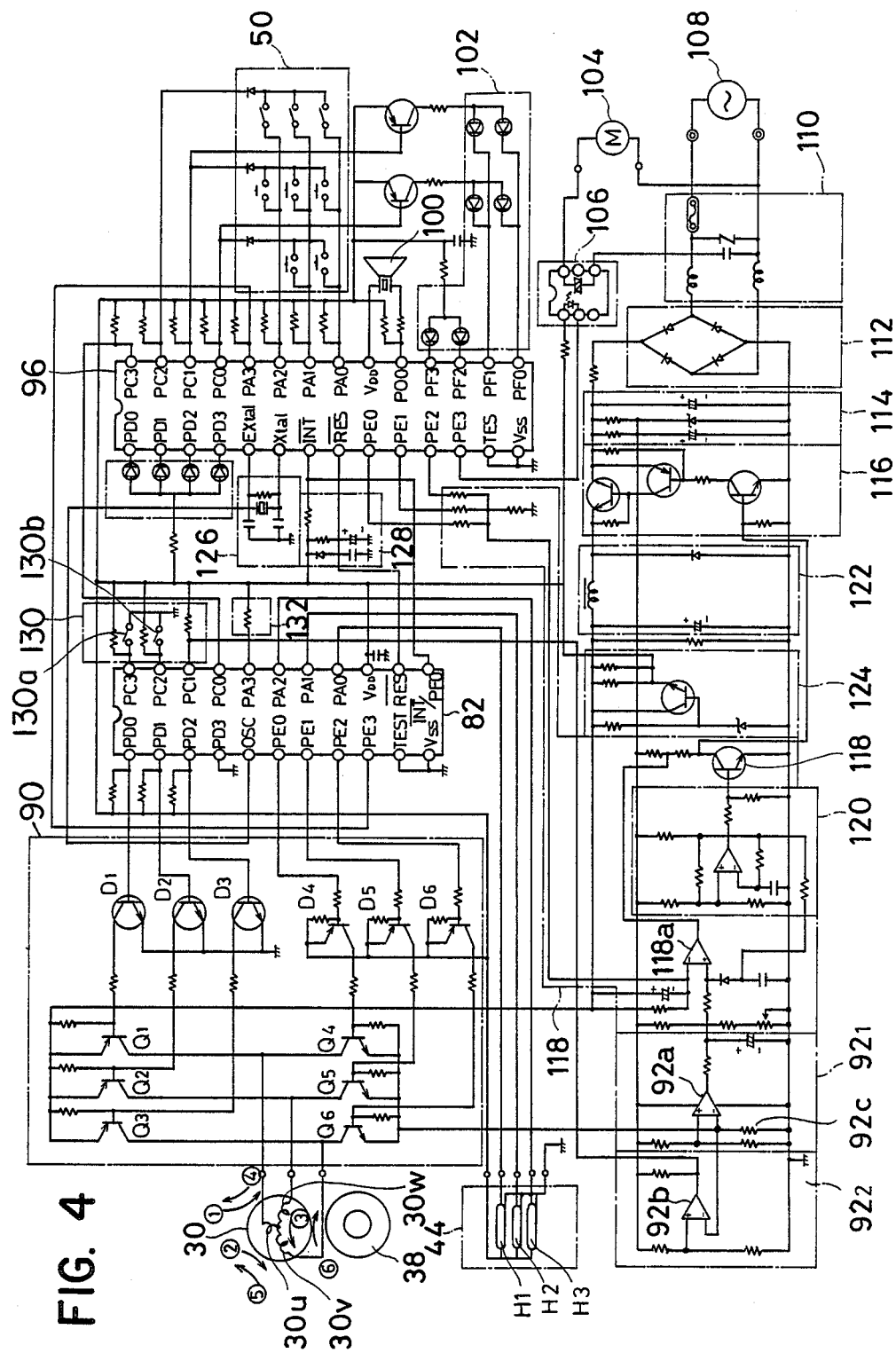
FIG. 4 is a circuit diagram showing in details of the embodiment in accordance with FIG. 3.

Referring to FIGS. 3 and 4, for driving the DC brushless motor 28, there is provided a driving control circuit 80, which includes a microcomputer or a microprocessor 82 such as an integrated circuit "LC 6526H" by Tokyo Sanyo. In the microcomputer 82, although not shown, a memory such as ROM or RAM and a necessary input and/or output port is provided. In the memory area of the microcomputer 82, a timer 84 and a counter 86 are formed to be used in determining the timing for applying the voltage to the DC brushless motor 28 as to be explained later in detail.

In brief, on the basis of the signal from a position detecting circuit 88 receiving the signal from the hall IC 44 disposed relative to the DC brushless motor 28, the microcomputer 82 gives the control signal to a driving circuit 90, from which the necessary phase signal is given to the coil of the DC brushless motor 28 with the timing corresponding to its control signal.

Referring to FIG. 4, to the three input terminals PA0 through PA2 of the microcomputer 82, the signals from the hall elements H1 through H3 included in the hall IC 44 are given respectively. From the output terminals PD0 through PD2 and PE0 through PE2 of the microcomputer 82, the driving signals for the drivers D1 through D3 and D4 through D6 are outputted. The drivers D1 through D3 included NPN transistors and the drivers D4 through D6 included PNP transistors. Accordingly, the drivers D1 through D3 are turned on when the high level is given to their base inputs, and are off when the low level is given. The drivers D4 through D6 are reverse. The respective collectors of the drivers D1 through D3 are connected to the bases of the switching transistors Q1 through Q3 comprising of the PNP transistors, and the collectors of the drivers D4 through D6 are connected to the bases of the switching transistors Q4 through Q6 comprising of the NPN transistors. The emitters of the switching transistor Q1 through Q3 are commonly connected to the DC constant voltage from a smoothing circuit 122 and the emitters from the switching transistors Q4 through Q6 are commonly connected to the ground. The respectively corresponding collectors of the switching transistors Q1 through Q3 and Q4 through Q6 are commonly connected to coils 30u, 30v and 30w of the stator 30 respectively.

Accordingly, with the switching transistors Q1 and Q5 ON, the current ① flows from the stator coils 30u to 30w. With the switching transistors Q1 and Q6 ON, the current ② flows from the stator coils 30u to 30v. With the switching transistors Q2 and Q6 ON, the current ③ flows from the stator coils 30w to 30v. With the switching transistors Q2 and Q4 ON, the current ④ flows from the stator coils 30w to 30u. With the switching transistors Q3 and Q4 ON, the current ⑤ flows from the stator coils 30v to 30u. With the switching transistors Q3 and Q5 ON, the current ⑥ flows from the stator coils 30v to 30w.

In the driving control circuit 80, a rotation error detecting circuit 92 is installed for detecting the abnormal rotation based upon the signal from the hall IC 44. The rotation error detecting circuit 92 detects a current value applied to the DC brushless motor 28 by a resistor 92c and compare the change by the comparators 92a and 92b to control. The fault detecting circuit 92 includes two circuits $92_1$ and $92_2$, the former being inputted to a first voltage control circuit 118 and the latter being inputted to the driving controller 82. The circuit $92_1$ is designed to protect the overvoltage in such a manner that, as the number of rotation is forcibly reduced when the impeller 40 and the rotor 32 rotating, for example, at 40 V 1500 r.p.m. has been effected by the external force (entwining of a curtain or the like), the current value in the resistor 92c is increased and by the output from the comparator 92a, the voltage set by the first voltage control circuit 118 is forcibly reduced from 40 V to 10 V.

The circuit $92_2$ operates as same as the circuit $92_1$, however, its setting value differs from the circuit $92_1$ and remains non-dissolved even at the overvoltage protection, thus when its rotation is reduced by the external force below the rotation set at 10 V, the comparator 92b outputs the signal which is inputted to a terminal PC1 of a microcomputer 84 in the driving controller 82 (the terminal PC1 which is normally at high level changes to low level then), thereby the driving controller 82 is controlled to stop the DC brushless motor 28.

There is also provided an operation control circuit 94, which on the basis of the signal from the switch 50 (FIG. 1), controls the operation such as changing the wind velocity. In the operation control circuit 94, a microcomputer or a microprocessor 96 such as an integrated circuit "Lc 6526" by Tokyo Sanyo, is disposed. In the microcomputer 96, the necessary input and output ports are also incorporated. The signal from the aforementioned switch 50 is given as the input signal to the microcomputer 96, which, in accordance with the input signal, controls a first voltage control circuit 118 included in a voltage controller 98 to control the voltage applied to the DC brushless motor 28, that is its rotating speed.

Meanwhile, in the operation control circuit 94, a sound circuit 100 generating a sound responsive to the operation of the switch 50, and an indicator circuit 102 including a light emitting diode, etc. indicating the operation of the switch 50 are incorporated in addition. Moreover, an oscillating motor driving circuit 106 for controlling an oscillating motor 104 incorporated in the oscillating device 46 (FIG. 2) is installed.

The oscillating motor 104 such as the induction motor receives the power from an AC power source 108, to which a filter circuit 110 is connected. The filter circuit 110 is, more definitely, consisting of coils and a capacitor as shown in FIG. 4 and used for removing the noise produced from the DC brushless motor 28 and so on. In the filter circuit 110, a circuit protective element for absorbing the surge voltage, for example, a varistor is further incorporated as shown in FIG. 4.

An AC voltage from the AC power source 108 is applied to a rectifier circuit 112 through the filter circuit 110. The rectifier circuit 112 is a full-wave rectifier circuit including diodes with bridge connections, and its output DC voltage is applied to the first constant voltage circuit 114 including a Zener diode as well as to a second voltage control circuit 116 incorporated in the voltage controller 98. The second voltage control circuit 116 acts based upon a controlling by the first voltage control circuit 118, which chops the applied DC voltage by the signal from an oscillation circuit 120. Thus, the chopped DC voltage is outputted from the second voltage control circuit 116, the output from which is smoothed by a smoothing circuit 122, DC voltage from which is applied to the driving circuit 90 of the motor driving control circuit 80.

From the rectifier circuit 112, the DC voltage having a mean value of 100 V and a peak value of approximately 141 V is outputted, which is chopped by the second voltage control circuit 116 (and the first voltage control circuit 118) incorporated in the voltage controller 98 and applied to the smoothing circuit 122. The smoothing circuit 122 includes a capacitor and a coil, to which the saw-teeth voltage of $LI^2t/2$ is induced and smoothed by the capacitor, then applied to the DC brushless motor 28 through the driving circuit 90.

At that time, the first voltage control circuit 118 is controlled by the microcomputer 96 incorporated in the driving controller 94 and changes the voltage applied to the DC brushless motor 28 or the output voltage from the smoothing circuit 122 from about 5 V up to 40 V. Thereby, the rotating speed of the DC brushless motor 28 may be changed from 250 r.p.m. up to 1500 r.p.m.

In the meantime, the DC voltage from the smoothing circuit 122 is also given to the second constant voltage circuit 124.

Since the microcomputer 82 incorporated in the driving controller 80 and the microcomputer 96 incorporated in the operation controller 94 are both arranged on the board 52 (FIG. 2), a clock of e.g. 800 KHz from a clock source 126 is commonly given to them and a resetting circuit 128 is connected in common. However, in case when these microcomputers 82 and 96 are each installed on the separate boards, the clock source 126 and the resetting circuit 130 are provided separately.

To the microcomputer 82, there is also connected a conduction angle setting circuit 130, which includes two switches 130a and 130b as shown in FIG. 4, by switching these switches on and off selectively, the different conduction angles are set.

To the microcomputer 82, there is connected a positive/reverse rotating mode selecting circuit 132, which, in this embodiment, includes a resistor a shown in FIG. 4, thus only the positive rotation is set. However, a suitable switch may be connected to set any of two modes, the positive or reverse rotation.

The DC brushless motor 28 includes, as shown in FIG. 4, the star-connected stator coils 30u, 30v and 30w, whose neutral point is not grounded. As shown in FIG. 2, the rotor magnet 38 secured to the yoke 36 is formed as an anisotropic magnet magnetized in reverse polarity alternately in its circumferential direction. The hall IC 44 includes, as shown in FIG. 4, the hall elements H1, H2 and H3 arranged at every angle associated with respective stator coils 30u, 30v and 30w. The signals from these hall elements H1, H2 and H3 are fed to the driving controller 80 as previously described.

The driving circuit 90 includes switching transistors Q1 through Q6 for applying the voltage successively to the stator coils 30u, 30v and 30w previously described at the prescribed timing, thereby being formed as the three-phase bipolar type driving circuit. However, it is not especially limited to this type, it may be formed as the three-phase unipolar type, or the other known driving method may be further utilized.

A timer 84 incorporated in the microcomputer 82 outputs the time-up signal after the fixed time, and a counter 86 is utilized for measuring the time intervals of the position signals from the hall elements H1 through H3.

Now, referring to FIG. 5, the operation of embodiment of FIG. 4 will be explained. In the first step S101 of the main routine of the microcomputer 96 controlling the electric fan, the microcomputer 96 is initialized. The microcomputer reads the state of speed setting switch 50 connected thereto in the next step S103. In the steps S105 and S107, the microcomputer 96 determines which of "high", "medium" or "low" has been set by the speed setting switch 50.

When "high" has been set, the microcomputer 96 sets the control data or compression data C1 corresponding to "high" in the following step S109. When "medium" has been set by the speed setting switch 50, another compression data C2 corresponding to "medium" is set in the step S111, and when "low" has been set by the speed setting switch 50, in the step 113, the compression data C3 corresponding to "low" is set, provided $C1>C2>C3$.

As the comparison data mentioned above, the data of rotation number is used when the abnormality of the DC brushless motor 28 is detected by the rotation number. When the varying time of the position detecting signal from the hall element is used as the data of rotating number as in the embodiment shown in FIG. 11 to be described later, as such comparison data C1, C2 or C3, it will be appreciated that the time data will be used. In this case, $C1<C2<C3$.

The microcomputer 96 enables the rotation of the DC brushless motor 28 by the microcomputer 82 in the step S115, after setting the compression data C1, C2 or C3 corresponding to the setting state set by the speed setting switch 50 in the steps S109–S113. More specifically, in the step S115, a signal is given to an input port PC0 of the microcomputer 82 from an output port PC3 of the microcomputer 96, thereby the microcomputer 82 is enabled.

Figure 6:
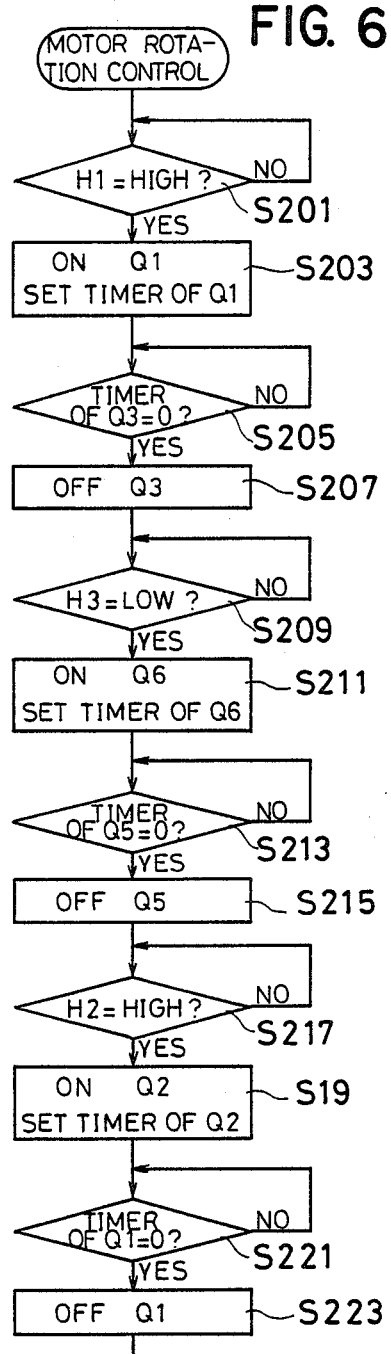
FIG. 6 is a flow diagram showing a rotation control of a DC brushless motor.
Figure 6:
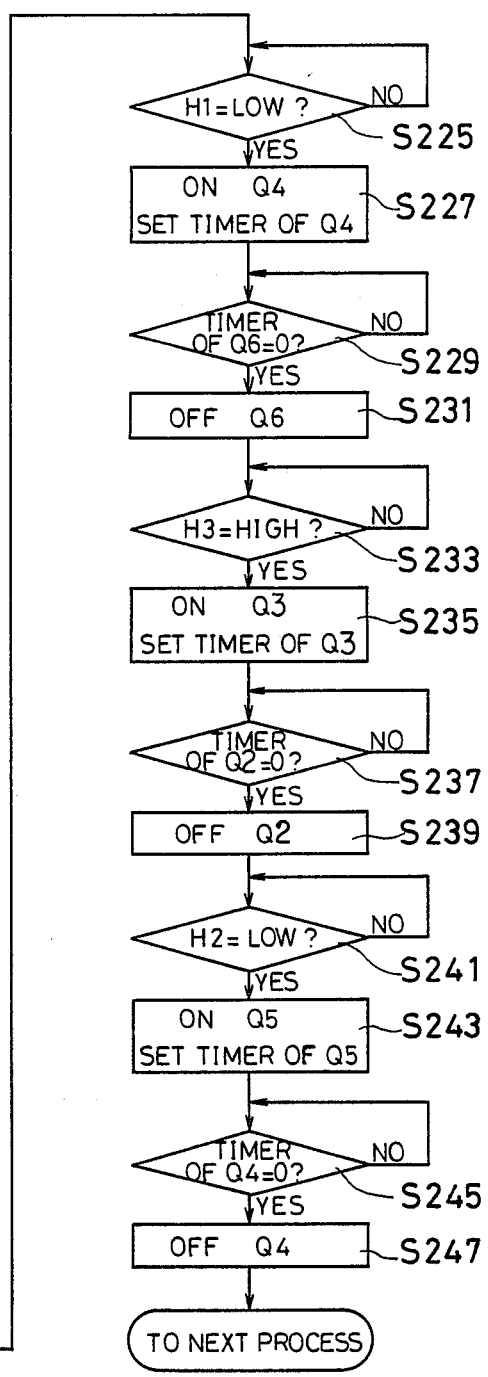

Now, although not being the essential part of the invention, referring to FIG. 6, control of the DC brushless motor 28 by the microcomputer 82 will be explained in brief. In the first step S201, the microcomputer 82 determines whether or not the signal (FIG. 7) from the hall element H1 included in the hall IC44 is at a high level on the basis of the signal from the input ports PA0–PA2. When the signal of the hall element H1 is at a high level, the microcomputer 82 outputs a high level signal at the output port PD0 so as to operate the driver D1 to turn on the switching transistor Q1 in the following step S203. Simultaneously, the microcomputer 82, in the step S203, sets the timer time during when the ON state of the switching transistor Q1 is to be continued into the timer 86 (FIG. 3) formed therein.

Next, in the step S205, the microcomputer 82 determines whether or not the timer for the switching transistor Q3 previously set has time-upped. If so, in the step S207, the microcomputer 82 outputs a low level signal from the output port PD2 so as to turn off the driver D3 and the switching transistor Q3. Thus, in the steps S201–S207, a control cycle wherein the switching transistor Q1 is turned on and the switching transistor Q3 is turned off is executed.

Then, in the following steps S209–S215, the microcomputer 82 executes a control cycle on the basis of the signal (FIG. 7) from the hall element H3 to turn on the switching transistor Q6, and to turn off the switching transistor Q5.

In the steps S217–S223, the microcomputer 82 executes a control cycle on the basis of the signal (FIG. 7) from the hall element H2 to turn on the switching transistor Q2 and to turn off the switching transistor Q1.

In the steps S225–S231, the microcomputer 82 executes a control cycle again on the basis of the signal from the hall element H1 to turn on the switching transistor Q4, and to turn off the switching transistor Q6.

Similarly, in the steps S233–S239, the microcomputer 82 again executes a control cycle on the basis of the signal from the hall element H3 to turn on the switching transistor Q3, and to turn off the switching transistor Q2.

In the steps S241–S247, the microcomputer 82 executes a control cycle again on the basis of the signal from the hall element H2 to turn on the switching transistor Q5 and to turn off the switching transistor Q4.

Figure 7:
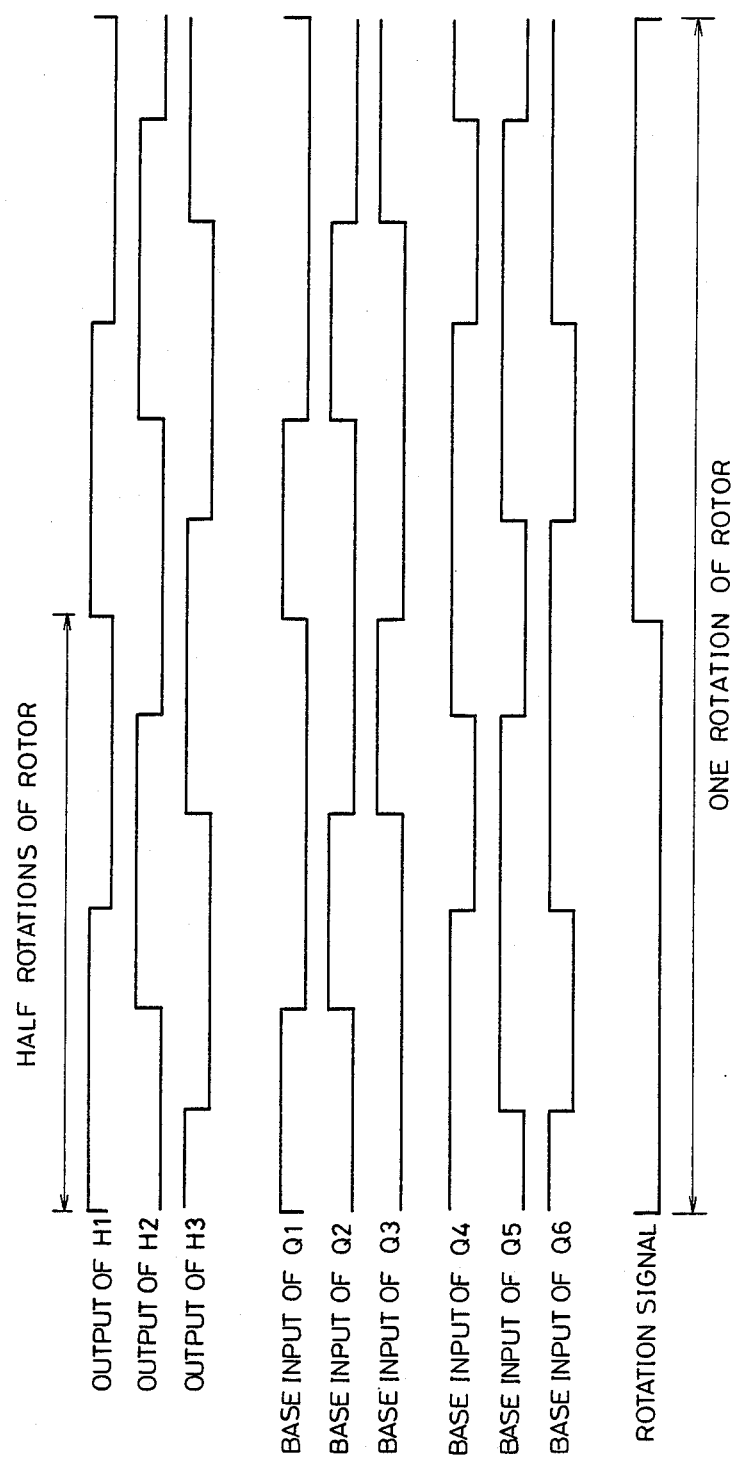
FIG. 7 is a timing diagram indicating each signal controlled in accordance with the flow diagram of FIG. 6.
Figure 9:
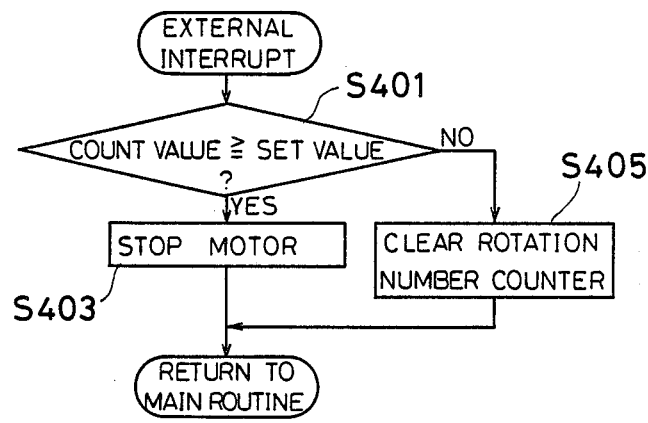
FIG. 9 is a flow diagram showing an external interruption routine of a microcomputer.

As such, by the microcomputer 82, directions of electric currents to the stator coils $30u$, $30v$ and $30w$ are changed over successively at every variation of magnetic pole position signals from the hall elements H1–H3 as shown in FIG. 7, and the rotor magnet 38 is rotated by one half of a rotation. During that period, the rotation signal of the rotor magnet 38 given to the input port $\overline{INT}$ of the microcomputer 82 is at a low level as is shown in FIG. 7. When the rotor magnet 38 is further rotated by one half of a rotation, the magnetic pole position signal 19 from the hall elements H1–H3 complete one cycle and return back to the initial signal pattern as is indicated in FIG. 7, so that such electric current control is repeated, thus the rotor magnet 38 given to the input port $\overline{INT}$ of the microcomputer 96 from the output port PF0 of the microcomputer 82 is at a high level as shown in FIG. 7. Consequently, the rotor magnet 38 is rotated continuously to continuously rotate the rotary shaft 34 or the impeller 40. To the microcomputer 96, the external interruption shown in FIG. 9 is applied at every falling edge of the rotation signal given to the input port $\overline{INT}$, or at each rotation of the rotor magnet 38.

Now, the relation between setting by the speed setting switch 50 and the voltage applied to the DC brushless motor 28 will be explained. When assuming that, for example, "low" has been set by the speed setting switch 50, then the microcomputer 96 outputs the high level signals at the output terminals PE0–PE2 alike. The voltage applied to the (−) input of a comparator 118a (FIG. 4) of the first voltage control circuit 118 incorporated in the voltage controller 98 is changed in response to the signals from the output terminals PE0–PE2. If the output terminals PE0–PE2 are at a high level alike, the voltage becomes maximum and a shortest chopper period by the second voltage control circuit 116 is set.

Thus, the voltage from the smoothing circuit 122 becomes about 5 V, which is controlled by the driving circuit 90 and is applied to the stator coils $30u$, $30v$ and $30w$ of the DC brushless motor 28. Accordingly, at this time, the DC brushless motor 28 is rotated at minimum speed, for example, at 250 r.p.m. and a minimum air volume is outputted from the impeller 40. On the contrary, if the output terminals PE0–PE2 are at the low level alike, the voltage becomes minimum and a longest chopper period by the second voltage control circuit 116 is set. Thus, the DC voltage from the smoothing circuit 122 becomes about 40 V, which is controlled by the driving circuit 90 and applied to the stator coils 30u, 30v and 30w of the DC brushless motor 28. Accordingly, at this time, the DC brushless motor 28 is rotated at the maximum speed, for example, at 1450 r.p.m. and a maximum air volume is outputted from the impeller 40.

Now, referring to FIG. 8, an internal interruption routine of the microcomputer 96 for evaluating data of rotating number of the DC brushless motor 28 will be explained. The internal interruption of the microcomputer 96 is started by the timer incorporated therein at a predetermined time, for example, at a period of t(m sec.).

Figure 8:
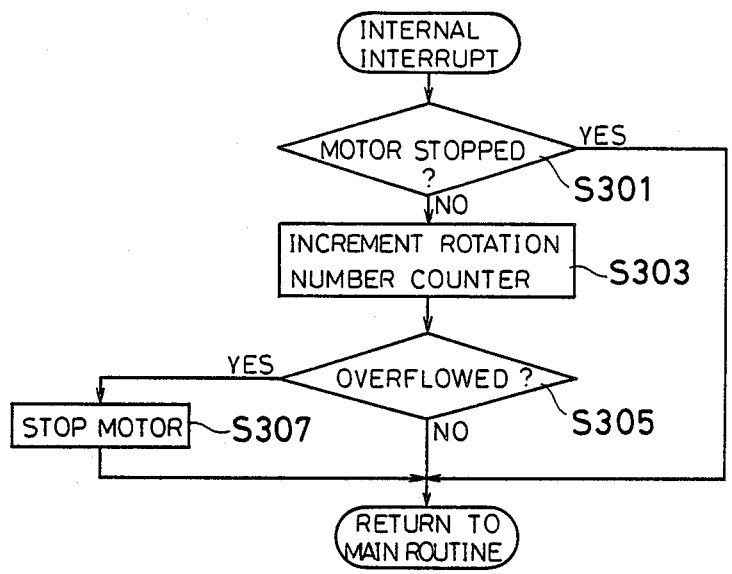
FIG. 8 is a flow diagram showing an external interruption routine of a microcomputer.

When the internal interruption is started in the first step S301 as illustrated in FIG. 8, the microcomputer 96 determines whether or not the DC brushless motor 28 is in a stop state by reading the signals from output ports PD0-PD2 and PE0-PE2 of the microcomputer 82. If the brushless motor 28 is in the stop state, processing by the microcomputer 96 is returned to the previous main routine in FIG. 5.

When the DC brushless motor 28 is not in the stop state, that is, when "OFF" is not set by the speed setting switch 50, the microcomputer 96, in the next step S303, increments a counter (not shown) provided in the prescribed area of the RAM incorporated therein. The counter serves as a counter for counting the data of rotating number of the DC brushless motor 28.

Next, the microcomputer 96 determines whether or not the rotation number counter has overflowed in the step S205. If not, processing of the microcomputer 96 is returned to the main routine shown in FIG. 5.

When the external interruption shown in FIG. 9 is not applied prior to the start of next internal interruption, that is, if the DC brushless motor 28 is not turned by one rotation, the internal interruption routine shown in FIG. 8 is repeated. As shown in FIG. 10, one rotation of the rotor magnet 38 of the DC brushless motor 28 corresponds to time successive falling edges of rotation signal from the output port PF0 of the microcomputer 82. Accordingly, if n times of internal interruptions are started in the microcomputer 96 during one rotation time, the time T required for one rotation T=n·t(m sec.). The microcomputer 96 can obtain the data of rotating number on the basis of time T required for one rotation. As the data of rotating number, however, a count value of the aforementioned counter can be utilized directly as it is.

If it is determined that the DC brushless motor 28 is in the stop state in the step 301, the rotation signal from the microcomputer 82 is naturally not obtained in such state, thus the external interruption routine shown in FIG. 9 is not started and the abnormal rotation of the DC brushless motor 28 can not be detected by the external interruption routine. Therefore, in such case, in this embodiment, when the rotation counter has been overflowed after being incremented during the internal interruption, the power supply to the DC brushless motor 28 is cut off as the abnormal rotation. To this end, the first voltage control circuit 118 is disabled by the microcomputer 96.

When the rotation counter is not overflowed and the falling edge of the rotation signal from the microcomputer 82 shown in FIG. 7 is inputted, the external interruption routine shown in FIG. 9 is applied to the microcomputer 96. In the first step S401 of the external interruption, the microcomputer 96 compares the count value of the rotation counter and comparison data C1, C2 or C3 set in the previous steps S109-S113 of FIG. 5. More specifically, the microcomputer 96 determines whether or not the count value is larger than the set value.

When the count value is larger than the set value, the rotating number of rotor magnet 38 of the DC brushless motor 28 has been decreased by a certain reason. Accordingly, in such state, the microcomputer 96, in the following step S403, controls the first voltage control circuit 118 to cut off the power supply to the DC brushless motor 28.

When the count value is smaller than the set value, the microcomputer 96, in the next step S405, clears the aforementioned rotation counter for the succeeding determination.

Now referring to FIG. 11, another embodiment will be explained. In the previous embodiment, abnormality of the DC brushless motor 28 was determined by detecting the data of rotating number of the rotor magnet 38 of the DC brushless motor 28. On the contrary, in this embodiment, the abnormal rotation of the DC brushless motor 28 is determined by counting the time between variation points of the position detecting signal from either of specific hall elements H1, H2 or H3.

Figure 11:
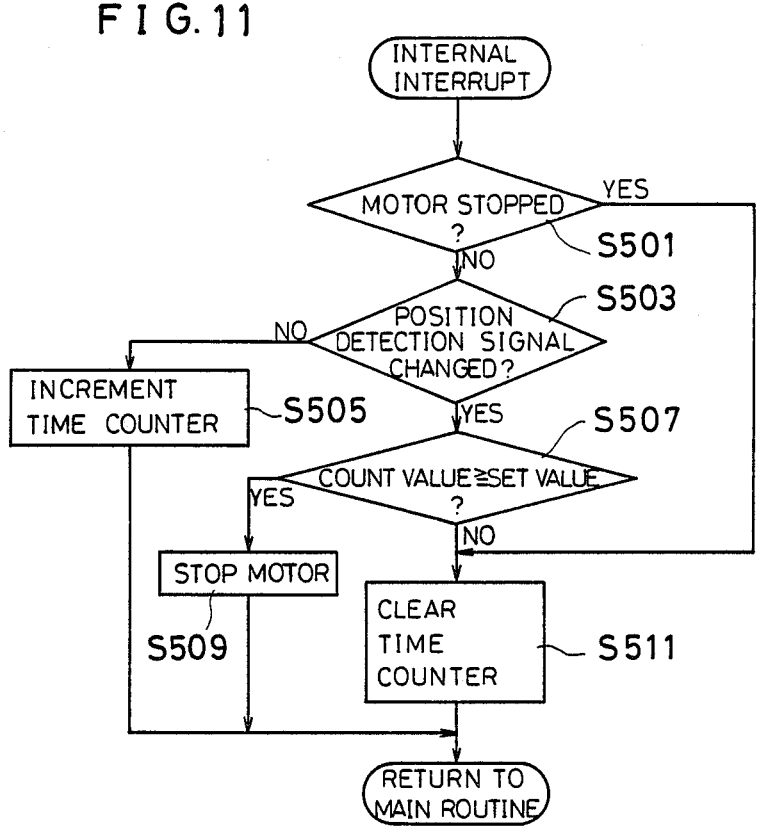
FIG. 11 is a flow diagram showing an internal interruption routine of a microcomputer of another embodiment in accordance with the present invention.

In the first step S501 shown in FIG. 11, as same as the previous step S301 shown in FIG. 8, the microcomputer 96 determines whether or not the DC brushless motor 28 is in a stop state. When it is not in the stop state, then in the next step S503, the microcomputer 96 determines whether or not the position detecting signal from one of the specific hall elements H1, H2 or H3 has changed on the basis of the signal from the microcomputer 82. In the RAM (not illustrated) incorporated in the microcomputer 96, the time counter which is to be reset in response to the variation of aforementioned position detecting signal is provided. When the position detecting signal is not changed, in the step S505, the microcomputer 96 increments the time counter. More specifically, when the DC brushless motor 28 is rotating and the position detecting signal from one of specific hall element H1, H2 or H3 is not changed, the aforementioned time counter is incremented at each execution of the internal interruption. The internal interruption timing in this state is shown in FIG. 12.

Figure 12:
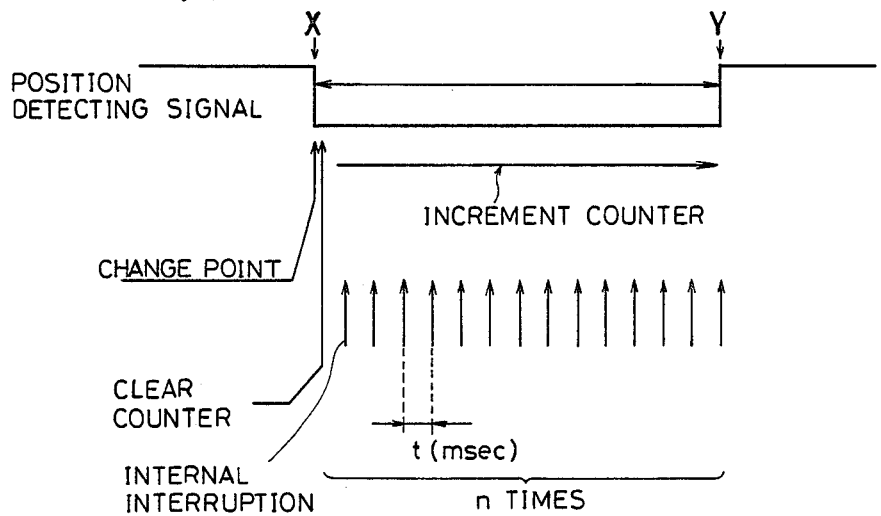
FIG. 12 is a timing diagram for explaining the operation of FIG. 11.

Referring to FIG. 12, when n times of internal interruptions of the predetermined period are executed between the variation points X and Y of the position detecting signal, the variation time will be given as n·t(m sec.).

Figure 5:
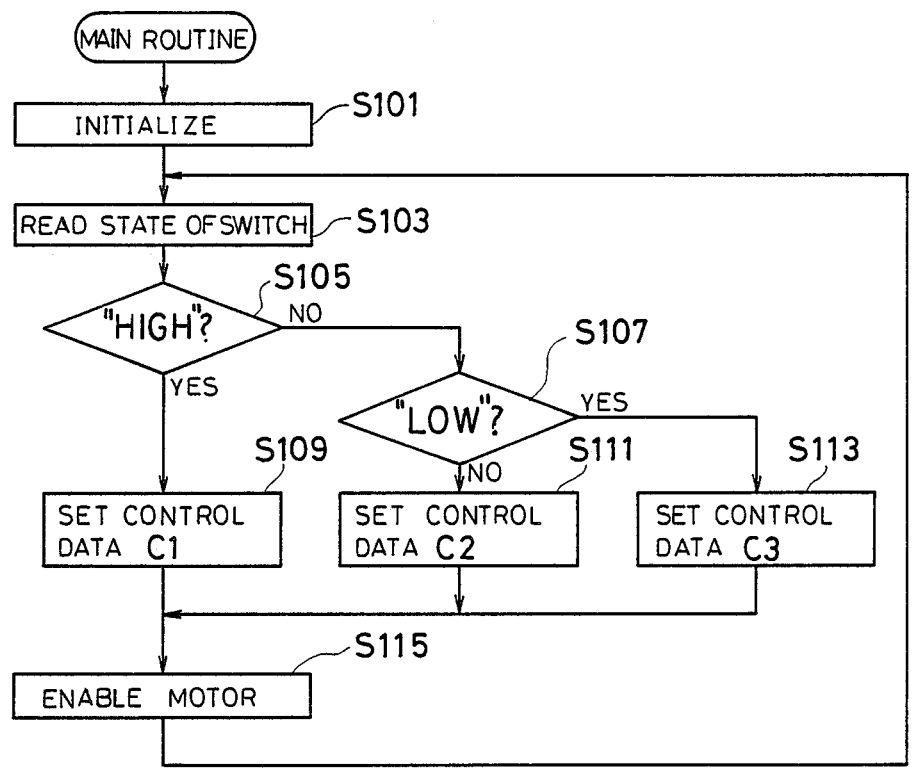
FIG. 5 is a flow diagram showing the main routine of a microcomputer.

When the position detecting signal from a specific hall element has changed in the step S507, the microcomputer 96 compares the count value counted from previous variation point of the time counter and the comparison data C1, C2 or C3 set in the previous step S109-S113 of FIG. 5. When the count value by the time counter is larger than the set value, the rotor magnet 38 of the DC brushless motor 28 is rotated extraordinarily slow and the rotation is abnormal, so that the microcomputer 96 cuts off the power supply to the DC brushless motor 28 in the same way as in the previous step S307 or S403.

On the contrary, when the count value of the time counter is smaller than the set value, in the same way as in the previous step S501 where it has been determined that the motor 28 is in the stop state, the time counter is cleared in the step S511 and the process of the microcomputer 96 is returned to the main routine.

Meanwhile, in the embodiment of FIG. 11, the variation time of the output signal from a specific hall element has been counted. However, the variation time may be counted, for example, as time between falling edges of the signals of one hall element and another hall element.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller of a DC brushless motor comprising:
   position detecting means provided in association with the DC brushless motor and for detecting the position of a rotor,
   data evaluating means for evaluating data of rotating number of the rotor on the basis of a position detecting signal outputted from said position detecting means, said data evaluating means including time counting means for counting time of the rotation of the rotor,
   comparing means for comparing the data of rotating number of the rotor evaluated by said data evaluating means and a predetermined value,
   electric power control means for (1) controlling the application of power to said motor in response to a result of the comparison by said comparing means, and (2) for stopping said motor by cutting off said power thereto when the rotating number of the rotor is reduced a predetermined amount irrespective of the electric power being supplied, and
   data setting means for setting comparison data to be compared by said comparing means.

2. A controller of a DC brushless motor in accordance with claim 1, wherein said time counting means is incorporated in a microcomputer.

3. A controller of a DC brushless motor in accordance with claim 2, wherein said microcomputer receives an interruption at predetermined time intervals, said time counting means counts the number of said interruption and is cleared in response to the rotation of the rotor.

4. A controller of a DC brushless motor in accordance with claim 3, wherein said interruption is an internal interruption at predetermined time intervals, said time counting means counts the number of said internal interruption and is cleared in response to the rotation of the rotor.

5. A controller of a DC brushless motor in accordance with claim 4, wherein said time counting means is cleared at each rotation of the rotor.

6. A controller of a DC brushless motor in accordance with claim 4, wherein said time counting means counts the time between variatious points of the position detecting signal from said position detecting means.

7. A controller of a DC brushless motor in accordance with claim 4, wherein said comparing means compares a count value of said time counting means and said predetermined value at each said internal interruption.

8. A controller of a DC brushless motor in accordance with claim 7, wherein said microcomputer receives an external interruption, said comparing means compares the count value of said time counting means and said predetermined value in response to said external interruption.

9. A controller of a DC brushless motor in accordance with claim 8, which further comprises means for applying said external interruption to said microcomputer on the basis of position detecting signal from said position detecting means.

10. A controller of a DC brushless motor in accordance with claim 9, wherein said external interruption applying means applies the external interruption to said microcomputer at each rotation of the rotor.

11. A controller of a DC brushless motor in accordance with claim 1, which further comprises speed changing means for changing the speed of said DC brushless motor.

12. A controller of a DC brushless motor in accordance with claim 11, wherein said data setting means includes means for setting different comparison data in response to the speed of said DC brushless motor.

13. A controller of a DC brushless motor, comprising:
    position detecting means for detecting the position of a rotor of said DC brushless motor,
    data evaluating means for evaluating data of rotating number of the rotor on the basis of a position detecting signal outputted from said position detecting means,
    rotation detecting means for detecting an abnormal state of rotation of the rotor of the DC brushless motor,
    electric power control means for controlling the application of electric power to said motor in response to detection state of said rotation detecting means, and
    said rotation detecting means includes means for detecting a reduction of rotating number of said rotor by application of an external force, and said electric power control means includes means for reducing electric power supplied to said motor in response to said means for detecting a reduction of rotating number.

14. A controller of a DC brushless motor in accordance with claim 13, wherein said means for detecting a reduction of rotating number includes comparing means for comparing the data of rotating number of the rotor evaluated by said data evaluating means and a predetermined value.

15. A controller of a DC brushless motor comprising:
    position detecting means provided in association with the DC brushless motor and for detecting the position of a rotor,
    data evaluating means for evaluating data of rotating number of the rotor on the basis of a position detecting signal outputted from said position detecting means,
    comparing means for comparing the data of rotating number of the rotor evaluated by said data evaluating means and a predetermined value,
    electric power control means for controlling the power supply in response to a result of the comparison by said comparing means,
    data setting means for setting comparison data to be compared by said comparing means, said data setting means including means for setting different comparison data in response to the speed of said DC brushless motor, and
    speed changing means for changing the speed of said DC brushless motor.

* * * * *